United States Patent
Wilson et al.

(10) Patent No.: US 8,711,502 B1
(45) Date of Patent: Apr. 29, 2014

(54) PREAMPLIFIER-TO-CHANNEL COMMUNICATION IN A STORAGE DEVICE

(71) Applicant: LSI Corporation, Milpitas, CA (US)

(72) Inventors: Ross S. Wilson, Menlo Park, CA (US); Jason S. Goldberg, Saint Paul, MN (US)

(73) Assignee: LSI Corporation, San Jose, CA (US)

(*) Notice: Subject to any disclaimer, the term of this patent is extended or adjusted under 35 U.S.C. 154(b) by 12 days.

(21) Appl. No.: 13/650,474

(22) Filed: Oct. 12, 2012

(51) Int. Cl.
*G11B 5/09* (2006.01)

(52) U.S. Cl.
USPC .............................................. 360/46; 360/67

(58) Field of Classification Search
None
See application file for complete search history.

(56) References Cited

U.S. PATENT DOCUMENTS

| | | | |
|---|---|---|---|
| 5,343,340 A * | 8/1994 | Boutaghou et al. | 360/77.08 |
| 5,726,821 A | 3/1998 | Cloke et al. | 360/67 |
| 5,829,011 A * | 10/1998 | Glover | 711/100 |
| 6,400,520 B1 * | 6/2002 | Stoutenburgh et al. | 360/63 |
| 6,404,578 B1 | 6/2002 | Bhandari et al. | 360/61 |
| 7,251,088 B2 | 7/2007 | Matsui | 360/55 |
| 7,869,153 B1 * | 1/2011 | Tan et al. | 360/67 |
| 8,154,972 B2 | 4/2012 | Ratnakar | 369/59.21 |
| 8,270,107 B1 | 9/2012 | Hudiono et al. | 360/31 |
| 2008/0055778 A1 | 3/2008 | Katou | 360/234.5 |
| 2009/0274017 A1 | 11/2009 | Nemazie et al. | 369/43 |
| 2010/0318868 A1 | 12/2010 | Howarth et al. | 714/746 |

* cited by examiner

*Primary Examiner* — Peter Vincent Agustin

(74) *Attorney, Agent, or Firm* — Christopher P. Maiorana, PC

(57) ABSTRACT

An apparatus comprising a preamplifier, a channel, and a controller. The preamplifier may be configured to read/write data to a drive with a read/write head, in response to (i) a plurality of digital control signals multiplexed to be sent/received over a first bus and (ii) one or more analog data signals sent/received over a second bus. The channel may be configured to (i) connect to the first and second bus, and (ii) send/receive the plurality of digital control signals through (a) a plurality of interconnects and (b) the first bus. The controller may be configured to send/receive the digital control signals over the interconnects. The apparatus may be configured to (i) read/write the analog data signals to the drive and (ii) generate the digital control signals, in response to one or more input/output requests received from a drive interface.

13 Claims, 5 Drawing Sheets

PREAMPLIFIER-TO-CHANNEL COMMUNICATION IN A STORAGE DEVICE

FIELD OF THE INVENTION

The present invention relates to data storage generally and, more particularly, to a method and/or apparatus for implementing preamplifier-to-channel communication in a storage device.

BACKGROUND OF THE INVENTION

Conventional preamplifiers used in storage devices implement an interface controller to communicate with a channel, preamplifier, and other elements through a synchronous three-wire port. Clock and data lines of the three-wire port (or several three-wire ports) are routed in parallel to various blocks within the storage device. Each block contains control and status registers. The status registers are hardwired to predetermined configurations, which vary according to customer preferences and specifications. When a customer requests a change, such reconfiguration requires a new chip mask.

It would be desirable to implement preamplifier-to-channel communication that allows migration of analog processing functions to a preamplifier, conserves circuit pads and/or may be easy to reconfigure without the need for a new mask.

SUMMARY OF THE INVENTION

The present invention concerns an apparatus comprising a preamplifier, a channel, and a controller. The preamplifier may be configured to read/write data to a drive with a read/write head, in response to (i) a plurality of digital control signals multiplexed to be sent/received over a first bus and (ii) one or more analog data signals sent/received over a second bus. The channel may be configured to (i) connect to the first and second bus, and (ii) send/receive the plurality of digital control signals through (a) a plurality of interconnects and (b) the first bus. The controller may be configured to send/receive the digital control signals over the interconnects. The apparatus may be configured to (i) read/write the analog data signals to the drive and (ii) generate the digital control signals, in response to one or more input/output requests received from a drive interface.

The objects, features and advantages of the present invention include providing a preamplifier that may (i) be used in a disc drive, (ii) provide multiplexed preamplifier-to-channel communication over a digital bus, (iii) provide a compact implementation, (iv) be used in a storage device, (v) reduce the number of bond pads needed for connections to external components, (vi) provide programmable preamplifier register-field mapping to implement a post production configurable design, (vii) conserve printed circuit board (PCB) area, (viii) provide additional externally controlled functions in a preamplifier without adding more control lines, (ix) provide signal processing in a preamplifier in a design that needs tight linkage between a channel and preamplifier and/or (x) optimize analog and/or digital components.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
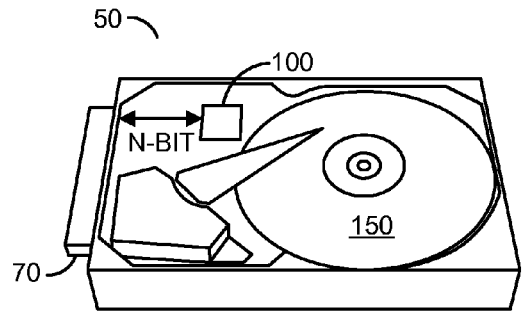
FIG. 1 is a diagram illustrating a context of the present invention.

Referring to FIG. 1, a block diagram of a drive 50 is shown. The drive 50 generally comprises an interface 70, a block (or circuit) 100 and a disc (or media) 150. The circuit 100 may be implemented as an electronics module. The circuit 100 may be implemented as a controller circuit that may be used to control reading and/or writing to the disc 150. The disc 150 may be implemented, in one example, as a rotating disc. The circuit 100 may communicate with an external device, such as a computer through the interface 70. In one example, the drive 50 may be implemented as a hard disc drive (HDD). In another example, an optical disc drive may be implemented. The particular type of drive and/or media implemented may be varied to meet the design criteria of a particular implementation.

Figure 2:
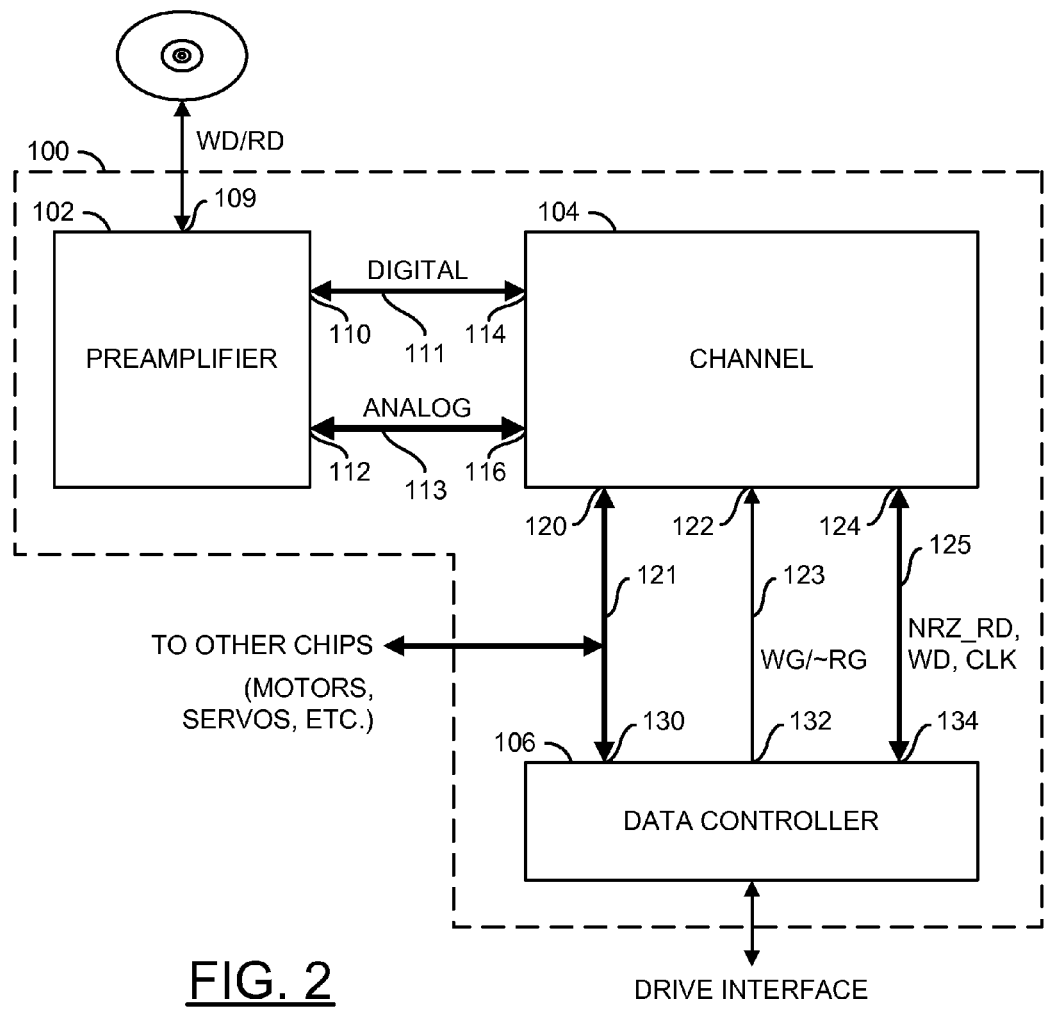
FIG. 2 is a diagram of the present invention.

Referring to FIG. 2, a block diagram of circuit 100 is shown in accordance with an embodiment of the present invention. The circuit 100 generally comprises a block (or circuit) 102, a block (or circuit) 104 and a block (or circuit) 106. The circuit 102 may be implemented as a preamplifier circuit. The circuit 104 may be implemented as a channel (e.g., a recording channel). The circuit 106 may be implemented as a data controller. In one example, the circuit 106 may be implemented as a data controller and/or control microprocessor. The circuit 102 may have an input/output 109, an input/output 110 and an input/output 112. The input/output 110 may present a signal (e.g., DIGITAL) over a bus 111. In one example, the bus 111 may be implemented as a high speed, single line serial bus. In another example, the bus 111 may be implemented as a two line differential bus. In another example, the bus 111 may be implemented with separate clock and serial data lines.

The signal DIGITAL may represent one or more digital control signals. The digital control signals may be multiplexed and/or transmitted as the signal DIGITAL. By multiplexing the digital control signals, the number of bond pads (or connections) between the preamplifier 102 and the channel 104 may be minimized. The particular protocol implemented and/or used to transmit and/or multiplex the signal DIGITAL may be varied to meet the design criteria of a particular implementation. The format of the multiplexing of the signal DIGITAL generally provides time slots for preamplifier mode-control tags, programmability of parameter registers, etc. In one example, the multiplexing of the signal DIGITAL may provide updates at submultiples of a system bit rate.

The input/output 112 may present a signal (e.g., ANALOG) over a bus 113. The bus 113 may represent a group of lines between the preamplifier 102 and the channel 104. The signal ANALOG may represent one or more analog read and/or write data signals. The signal ANALOG generally represents data read from or written to the disc 150. The circuit 102 may present/receive a read or write signal (e.g., WD/RD) on the input/output 109 in response to the signal DIGITAL and the signal ANALOG. The signal WD/RD may represent low-level analog read signals and/or high-level analog write data signals in a format to be read/written to/from the disc 150.

The circuit 104 may have an input/output 114 that may present/receive the signal DIGITAL from the bus 111 and an input/output 116 that may present/receive the signal ANALOG from the bus 113. The circuit 104 may also have an input/output 120 connected to a bus 121, an input 122 connected to a bus 123 and an input/output 124 connected to a bus 125. The circuit 106 may have an input/output 130, an output 132 and an input/output 134. The input/output 120 may be connected to one or more control chips. For example, the output 120 may be connected to one or more motors, servos, etc. that may be used to operate the moving parts (e.g., the spindle motor, head actuator, etc.) of the drive 50. The input 122 may receive one or more signal(s) (e.g., WG/~RG). The signal(s) WG/~RG may be a control signal (or signals) configured to control read/write operations of the drive 50. In general, the drive completes one operation (e.g., a read) before starting another operation (e.g., a write). In one example, one polarity of the signal WG/~RG may be referred to as a write signal (e.g., WG) and one polarity (e.g., an opposite polarity) may be referred to as a read signal (e.g., ~RG). In one example, two wires may be implemented (e.g., one for the signal WG and one for the signal RG). A servo gate signal (e.g., SG) may also be implemented.

The input/output 124 may present a number of control signals NRZ_RD (e.g., NRZ read data), WD, and/or CLK. In the example shown, the channel 104 may communicate with the motors, servos, etc. through the bus 121, while the signal DIGITAL may communicate as a high speed control directly coupled to the preamplifier 102 over the bus 111. In general, the signals transmitted on the bus 121, the bus 123 and/or the bus 125 operate at a speed that is generally lower than the operating speed of the bus 111. The signals transmitted on the buses 121, 123 and/or 125 are generally mapped to the bus 111. The bus 111 may also convey additional information that originates from the channel 104. The bus 111 generally provides a direct communication between the preamplifier 102 and the channel 104.

The circuit 100 may provide a compact implementation for encoding and/or multiplexing one or more control signals WG and/or RG. The control signals WG and/or RG may be transmitted over the bus 111. The communication of the various signals over the high speed digital bus 111 may allow various functions normally performed by the channel 104 to be performed by the preamplifier 102. The bus 111 may also allow sequencing signals (e.g., WG and/or RG) to be transferred between the preamplifier 102 and the channel 104. Parameter set-up information may also be transmitted over the bus 111. The high speed digital bus 111 may also reduce the total number of interconnects between the preamplifier 102 and the channel 104.

In general, the preamplifier 102 may be implemented using a process technology optimized for transmission and/or processing of analog signals. For example, the preamplifier 102 may be implemented using bi-polar (or bi-CMOS) processing technology. The channel 104 may be implemented using a process technology optimized for the transmission and/or processing of digital signals. For example, the channel 104 may be implemented using a CMOS processing technology. In general, the preamplifier 102 may implement near-symbol-rate adaptation updates from the signals received from the channel 104. The circuit 100 may be used to enhance and/or simplify the communication between the amplifier 102 and the channel 104.

Figure 3:
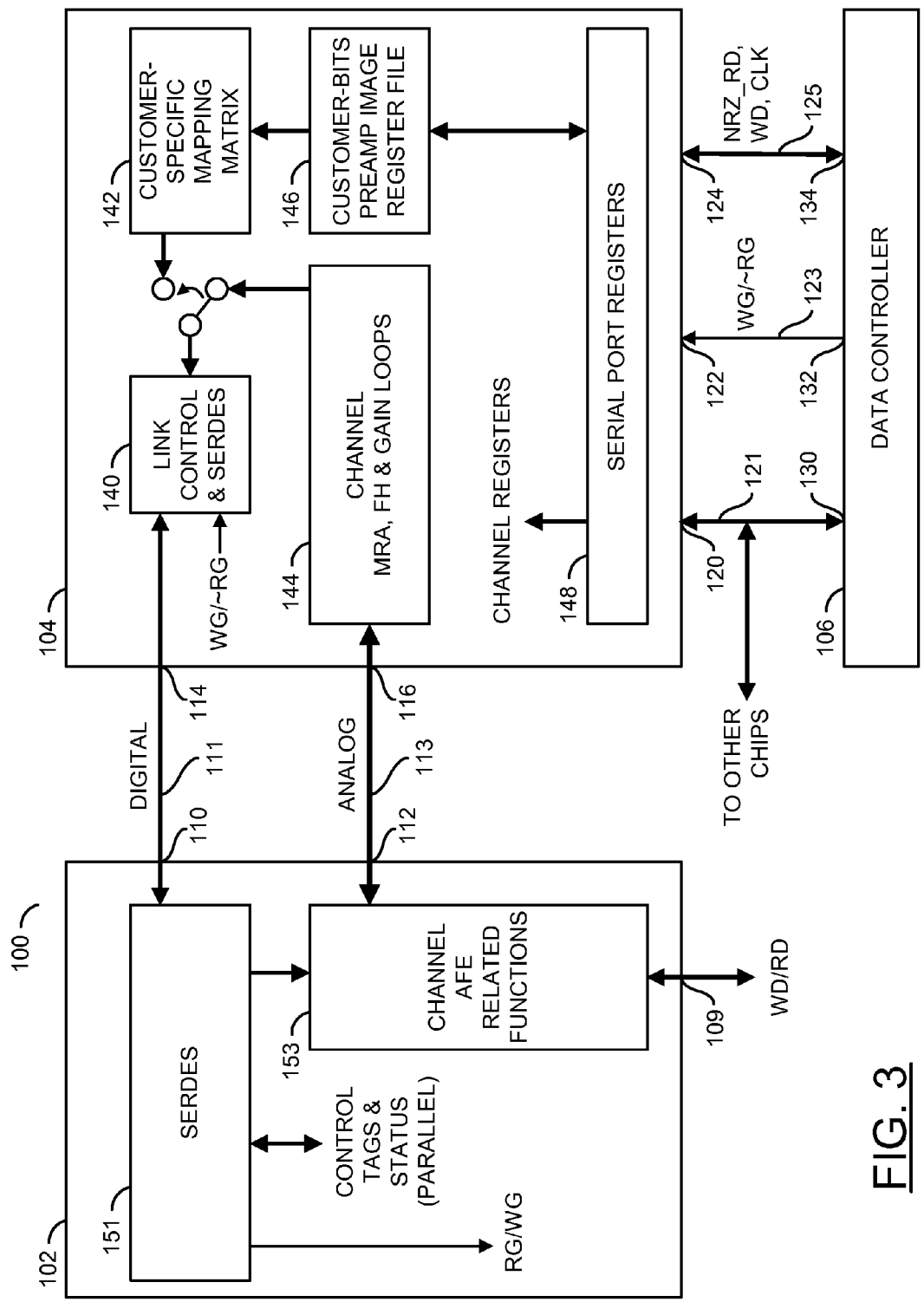
FIG. 3 is a more detailed diagram of the circuit of FIG. 2.

Referring to FIG. 3, a more detailed diagram of the circuit 100 is shown. The circuit 102 generally comprises a block (or circuit) 151 and a block (or circuit) 153. The circuit 150 may be implemented as a serializer/deserializer circuit (SERDES). The circuit 153 may be implemented to provide functions related to a channel Analog Front End (AFE). The circuit 151 may receive the signal DIGITAL. In one example, the signal DIGITAL may be a continuously (or non-continuously) running CML bi-directional differential serial signal (e.g., either self-clocking or accompanied by a clock signal). The circuit 153 may receive the signal ANALOG. In one example, the signal ANALOG may include analog read data, analog write data, and/or HAMR laser-control data. However, other signals may be presented as the signal ANALOG.

The circuit 104 generally comprises a block (or circuit) 140, a block (or circuit) 142, a block (or circuit) 144, a block (or circuit) 146 and a block (or circuit) 148. The circuit 140 may be implemented as a link control and/or SERDES circuit. In one example, the circuit 142 may be implemented as a customer-specific mapping matrix circuit. The circuit 144 may be implemented as adaptive update elements of an MRA, fly height and/or gain control loop. Other functions that benefit from an analog process and/or that may use high speed control updates may also be implemented. The circuit 146 may be implemented to store one or more customer bits, a preamplifier image register file, etc. The circuit 148 may be implemented as one or more serial port registers.

The data controller 106 may receive data transfer requests (e.g., input/output (I/O) requests) and/or access positioning orders from a user interface in the data controller 106. The controller 106 may provide data buffering, and/or may translate orders into commands sent to the preamplifier 102 and/or the channel 104.

Figure 4:
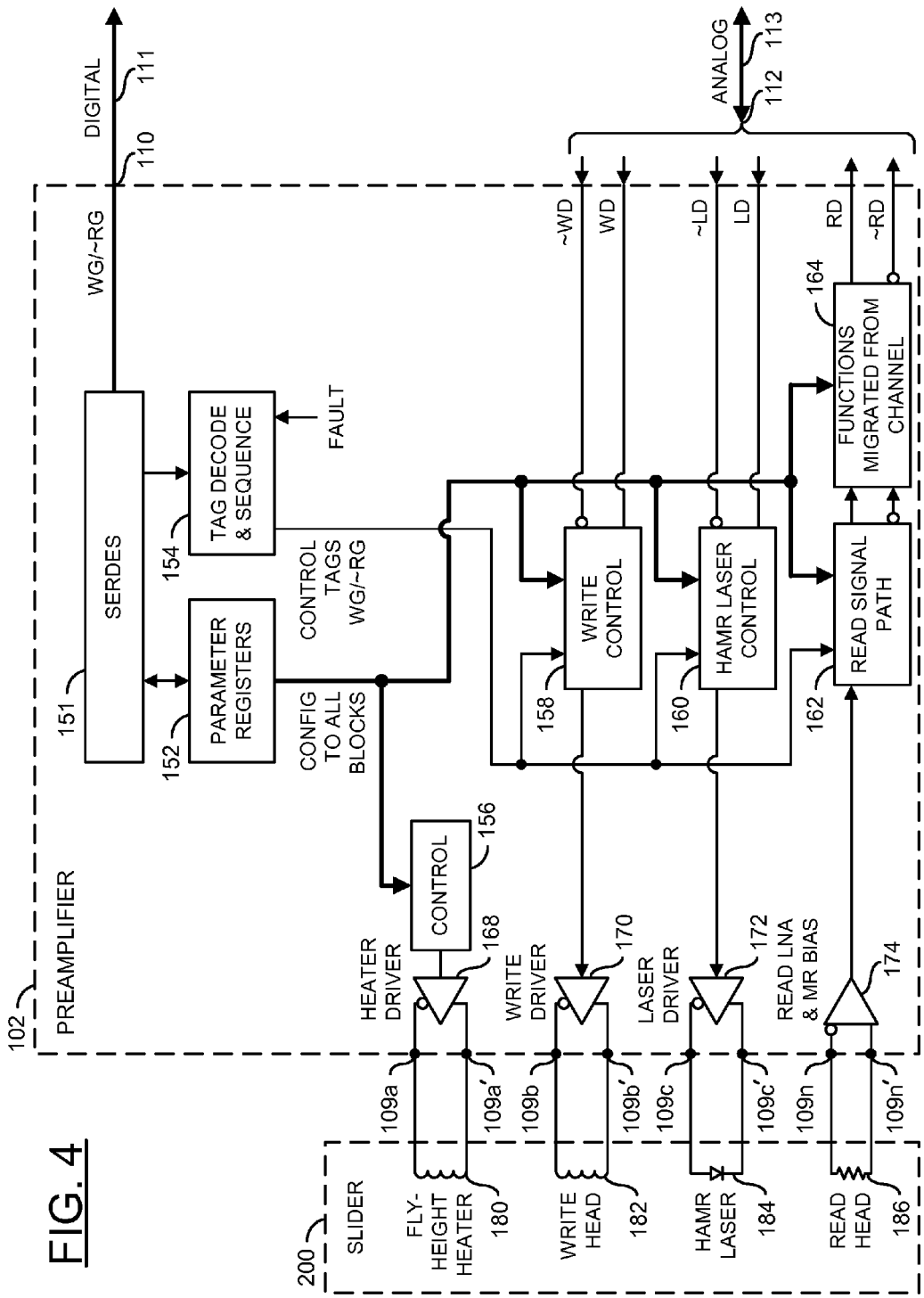
FIG. 4 is a diagram illustrating link signals of the preamplifier and channel.

Referring to FIG. 4, a more detailed diagram of the preamplifier 102 is shown. The preamplifier 102 generally comprises the SERDES circuit 151, a parameter register circuit 152, a block (or circuit) 154, a block (or circuit) 156, a block (or circuit) 158, a block (or circuit) 160, a block (or circuit) 162, a block (or circuit) 164, a plurality of circuits 168, 170, 172 or 174. The circuit 152 may be implemented as a parameter register circuit. The circuit 154 may be implemented as a tag decode and sequence circuit. The circuit 156 may be implemented as a control circuit. The circuit 158 may be implemented as a write control circuit. The circuit 160 may be implemented as a laser control circuit. The circuit 162 may be implemented as a read signal path. The circuit 164 may be implemented as a circuit configured to process functions migrated from the channel. The circuit 170 may be implemented as write driver circuit. The circuit 174 may be implemented as a read driver circuit. A slider circuit 200 is also shown. The slider 200 may be implemented as part of the drive 50. The slider 200 "flies" above the recording surface of the disc 150. For example, the slider 200 may slide on a thin air film to move over individual tracks of the disc 150. The slider 200 generally contains a fly height heater 180, a write head 182, a HAMR laser 184 (e.g., for HAMR recording) and/or a read head 186.

During write operations, the preamplifier 102 and/or the recording channel 104 may serialize and/or encode write data signals (e.g., NRZ_WD) received from the controller 106 through the bus 125. The format of encoding may be in a form that may be recorded on the disc 150 after high power amplification by the write control circuit 158 and/or the write driver circuit 170 in the preamplifier circuit 102. During read operations, the preamplifier circuit 102 and/or the recording channel 104 may cooperate to amplify one or more low-level playback signals produced by the read head 186. The channel 104 may amplify and/or filter signals in the analog domain, then equalize, detect, deserialize and/or recover a clock signal and/or deliver NRZ read data through the bus 125. Some or all of the functions of various circuits conventionally implemented in the read channel 104 may be migrated to the preamplifier circuit 102.

The channel 104 may contain a modest amount of analog functionality to process the amplified readback signal delivered by the preamplifier 102. Signal amplitude regulation (e.g., automatic gain control), high-order lowpass anti-alias filtering/boosting, and/or asymmetry correction, may be performed by the preamplifier 102.

The CMOS process used to implement the channel 140 may be ill-equipped to implement precision analog circuits of the preamplifier 102. Locating the analog circuits in the preamplifier 102 may provide a more robust and/or accurate analog bi-polar implementation. For example, a variable gain amplifier (VGA) and/or an automatic gain control function may be migrated from the channel 104 to the preamplifier 102. Loop transport delay of VGA gain updates are normally minimized by using high update rates.

The circuit 100 may be implemented to provide a channel-to-preamplifier interface. For example, a less than 28 nm process may be used to reduce the size of the die needed to implement the channel 104 and/or to enhance the operating speed of the channel 104. In one example, a Silicon Germanium (SiGE) process may be used to implement the preamplifier 104 (e.g., to obtain high-quality analog signal processing). Availability of the high speed link 111 between preamplifier 102 and the channel 104 may allow read/write mode control changes and/or status presentation from the preamplifier 102 to be signaled without use of dedicated tags and/or with modest latency. Enhanced performance may be achieved by relocating circuitry from the channel 104 to the preamplifier 102.

Since disc drive designers are often reluctant to change legacy firmware, proprietary preamplifier register maps may be implemented in the circuits 142 and/or 146. The high-speed communication link 111 facilitates bit mapping within the recording channel 104, where bit mapping may be performed more efficiently than in the preamplifier 102. The channel 104 may include a programmable look up table in the circuit 166 to provide various mappings to meet various customer specifications.

The circuit 100 may incorporate the high-speed serial link 111 to join the channel 104 and the preamplifier 102. To reduce wire count, the signal DIGITAL may employ differential self-clocked current-mode signaling (e.g., to aid fast turnaround). In one example, a self-clocking data format (e.g., 8b/10b) may be further extended by multilevel signaling. Alternatively, the signal DIGITAL may contain a dedicated clock line, removing the need for a phase-locked loop in the SERDES 151. A self-clocking data format is normally not needed when an external clock is implemented. The link 111 may be supported in the channel 104 and/or the preamplifier 102 by the SERDES circuit 151 and/or the link control circuit 140. A wide choice of techniques and/or signaling protocols may be used to implement the link 111.

In one example, the circuit 100 may include pre-emphasis or adaptive equalization (e.g., which may increase bit rate), which may be simplified if the physical length of PCB traces implementing link 111 between the channel 104 and/or the preamplifier 102 is short (e.g., less than 10 cm). To minimize logic in the preamplifier 102, an adaptive portion of such equalization may be implemented in the circuit 140. The result transmitted (e.g., a low bit rate, perhaps not implementing equalization), may be set to one or more taps of an equalizing FIR in the preamplifier 102 during a setup phase. In one implementation, most transactions on link 111 concern transmissions from the channel 104 to the preamplifier 102. In addition, readback capability from the preamplifier 102 may be provided to support additional functions (e.g., status/fault indication, etc.).

In one example within the preamplifier 102, the circuit 152 may identify circuits previously contained in the channel analog front end to be migrated to the preamplifier 102. Some of these circuits may be adaptive and/or rely on continuous updates from the digital control loops in the circuit 144. Real-time control information may be sent from the SERDES circuit 151 to the circuit 152. To close the loop, adaptation control information in the channel 104 is normally delivered from the circuit 144 to the SERDES circuit 151 over the bus 111 for reception in the preamplifier 102. The link control and SERDES circuit 140 may multiplex and/or serialize control information received from the circuit 144. The circuit 140 may present the result on the bus 111.

Another benefit of the circuit 100 is the potential to map one or more preamplifier control registers in arbitrary fashion (e.g., from a specific customer-desired configuration to a fixed configuration in the preamplifier 102). The circuit 142 may provide such mapping. The circuit 142 may contain bit translation maps (e.g., implemented possibly in EEPROM/FLASH, as special masking registers, etc.). The channel 104 is generally built on a state of the art digital process, so packing efficiency of the circuits 142 may be high. Images of all of the preamp control registers 146 may reside in the channel 104.

The existing read/write signal differential pairs RDP/RDN and/or WDP/WDN may remain unchanged from previous implementations. The signals RDP/RDN and/or WDP and/or WDN may, in one example, be multiplexed in various ways in accordance with write and/or read-mode data transfer specifications. In an HAMR recording system, an additional laser control signal (e.g., LASERP/LASERN) may be implemented. The signal LASERP/LASERN may be multiplexed, for example, along with the signals RDP/RDN. As described, read and write operations are generally mutually exclusive.

Figure 5:
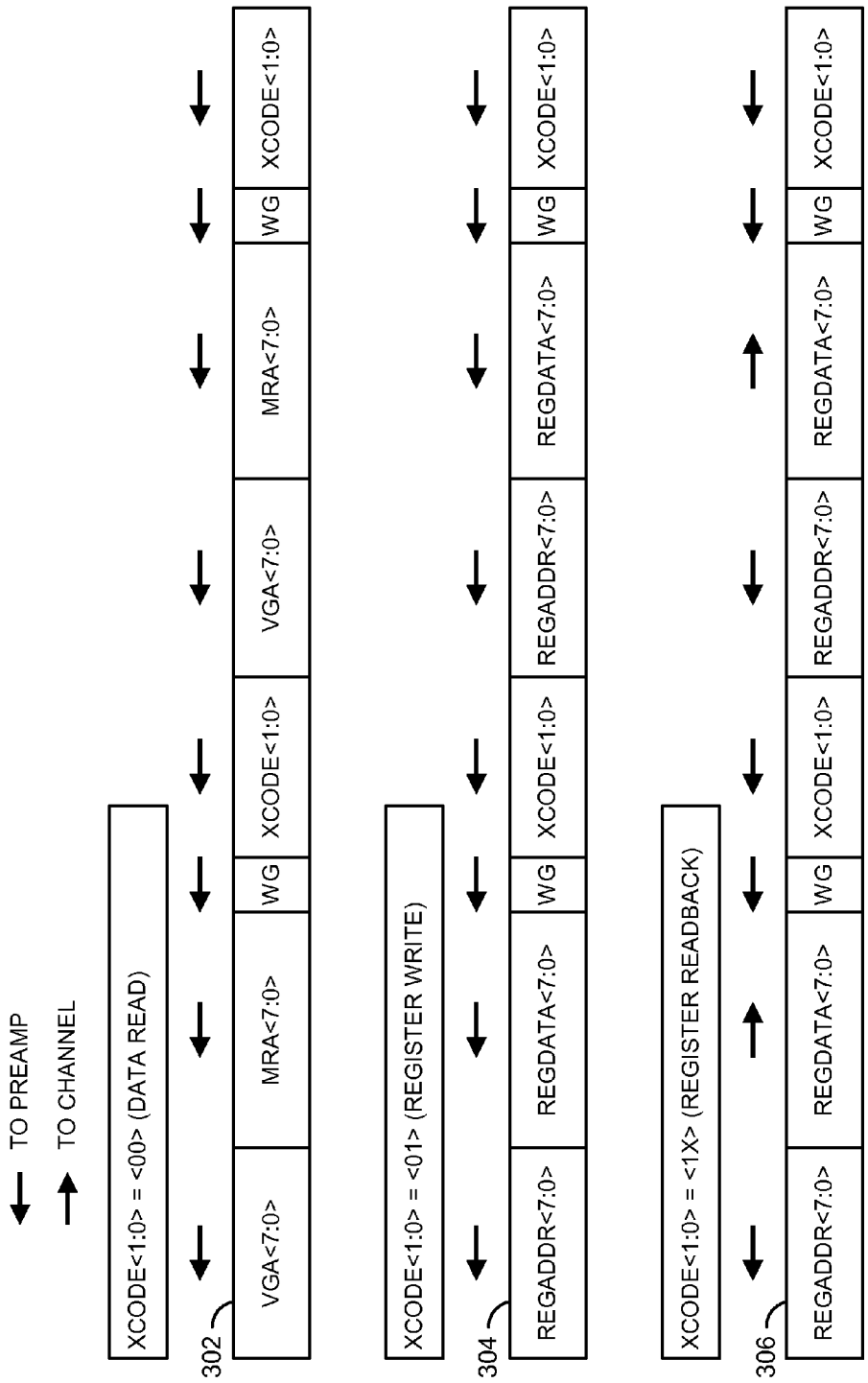
FIG. 5 is a diagram of an example sequence communication between the preamplifier and the channel.

Referring to FIG. 5, a representative data format for transactions on the bus 111 is shown. Various fields are shown in unencoded form (e.g., before implementing any run-length constraints that may be used for clock recovery by the SERDES circuit 151). FIG. 5 shows a sequence 302, a sequence 304 and a sequence 306. For illustrative purposes, the preamplifier 102 may contain the VGA and/or MRA circuit 144 previously located in the channel 104. Additional functionality may be added. For example, computation of demanded power from an automatic fly-height control process may be implemented in the channel 104. The computed result may be sent to the heater driver 168 to alter the height of the slider 200.

The sequence 302 shows link signaling during a data read. The preamplifier 102 and the channel 104 may be reading and/or detecting data. The field XCode<1:0> identifies the type of link transaction. In this case, a continual issuance to the VGA and/or MRA circuits in the preamplifier 102 may occur. Gain and/or asymmetry regulation information (e.g., MRA) may be computed in the channel 104. The write gate signal WG is frequently transmitted to reduce latency. In one example, a read gate signal RG may be independently transmitted at a similar recurrence rate, to control the reader in the preamplifier 102. In the example of a 5 Gb/s link rate, (e.g., when neglecting link coding for simplicity), the illustrated sequence may achieve a VGA/MRA/Write Gate update rate of 3.8 ns (e.g., a low latency).

During a read-from-preamplifier sequences, a PLL VCO of the SERDES circuit 151 may freewheel at a last frequency/phase setting. In one example, the VCO may run at a multiple of write data rates. The sequence 304 and the sequence 306 illustrate dedicated preamplifier register write and/or read operations, respectively. In these cases, the field XCode<1:0> may take on values <01> and <1X>, respectively. The sequence 302 may also include direction-turnaround times (not shown) necessary in reversing link direction. Alternatively, when 'Beginning of Record' frame is periodically transmitted, the write gate signals WG may be precisely asserted in the preamplifier 102 by counting a programmable interval from one such mark.

Figure 6:
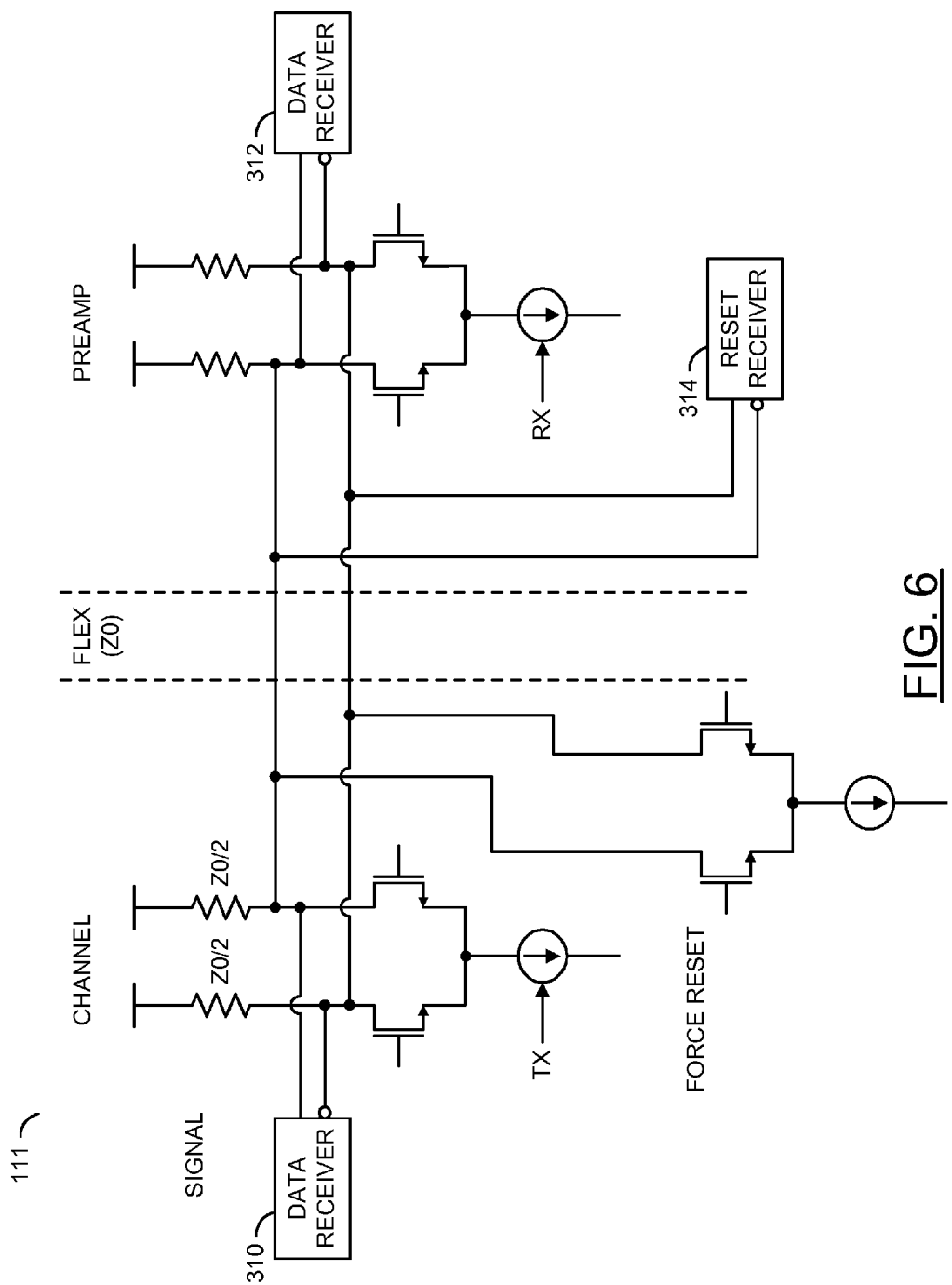
FIG. 6 is a diagram of a current mode logic (CML) implementation of the link of FIG. 3.

Referring to FIG. 6, an example implementation of the link 111 is shown. The link 111 is shown with a CML implementation for fast turnaround. A number of data receive blocks 310 and 312 receive the high-speed transmitted/received bitstreams. A reset receiver block 314 is shown. The reset receiver block 314 may detect an out-of-normal level signal and force a reset signal from the controller.

In one example, forcing an unambiguous reset of the preamplifier 102 may be needed. One approach may recognize that in normal operation, the link 111 may convey a dense sequence of data transitions. By high-pass filtering and/or rectification, followed by a low-pass and/or thresholding operation, long idle states on the link 111 may be detected and/or used to trigger a forced reset of the preamplifier 102. Alternatively, the lines in the link 111 may be pulsed to a high level (e.g., beyond the level expected in the data) to force reset.

By using the circuit 100, a number of single-ended preamplifier signals (e.g., SPD, SPC, SPE, WG, FLT, and/or MODE) may be replaced by a single differential pair LinkP/LinkN. In non-HAMR systems, an opportunity may occur when the signals RD and/or WD signals may also be multiplexed, which are generally mutually exclusive. In HAMR systems, HAMR laser data may be multiplexed onto the RD lines. In general, the circuit 100 may remove three pads compared with conventional approaches. Such a reduction in pad count may be weighed against the increased circuit complexity.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. An apparatus comprising:
  a preamplifier configured to read/write data to a drive with a read/write head, in response to (i) a plurality of digital control signals multiplexed to be sent/received over a first bus and (ii) one or more analog data signals sent/received over a second bus;
  a channel configured to (i) connect to said first and second bus, and (ii) send/receive said plurality of digital control signals through (a) a plurality of interconnects and (b) said first bus; and
  a controller configured to send/receive said digital control signals over said interconnects, wherein said apparatus is configured to (i) read/write said analog data signals to said drive and (ii) generate said digital control signals, in response to one or more input/output requests received from a drive interface.

2. The apparatus according to claim 1, wherein said preamplifier is fabricated on a first integrated circuit and said channel and said controller are generated on a second integrated circuit.

3. The apparatus according to claim 2, wherein said first integrated circuit is implemented using a bi-CMOS processing technology and said second integrated circuit is generated using a CMOS processing technology.

4. The apparatus according to claim 1, wherein said channel is configured to generate one or more motion control signals used to control mechanical portions of said drive.

5. The apparatus according to claim 1, wherein said first bus comprises a high speed single line serial bus.

6. The apparatus according to claim 1, wherein said first bus comprises a high speed two line differential bus.

7. The apparatus according to claim 2, wherein said first integrated circuit is optimized for transmission of analog signals and said second integrated circuit is optimized for transmission of digital signals.

8. The apparatus according to claim 1, wherein said apparatus generates one or more motion control signals.

9. The apparatus according to claim 8, wherein the one or more motion control signals control one or more servos used to move a slider of said drive.

10. The apparatus according to claim 1, wherein said drive interface is configured to transfer/receive data to/from an external device.

11. The apparatus according to claim 1, wherein said apparatus comprises a control circuit in a hard disc drive (HDD).

12. The apparatus according to claim 1, wherein said apparatus comprises a control circuit in an optical disc.

13. A method for implementing preamplifier to channel communication in a storage device, comprising the steps of:
  reading/writing data with a read/write head, in response to (i) a plurality of digital control signals multiplexed to be sent/received over a first bus and (ii) one or more analog data signals sent/received over a second bus;
  implementing a channel to (i) connect to said first and second bus, and (ii) send/receive said plurality of digital control signals through (a) a plurality of interconnects and (b) said first bus; and
  sending/receiving said digital control signals over said interconnects, wherein said method is configured to (i) read/write said analog data signals to said drive and (ii) generate said digital control signals, in response to one or more input/output requests received from a drive interface.

* * * * *